United States Patent [19]

Raedecke

[11] 3,893,164

[45] July 1, 1975

[54] SYSTEM FOR COMB-FILTERING TELEVISION SIGNALS

[75] Inventor: Helmut Raedecke, Darmstadt, Germany

[73] Assignee: Robert Bosch Fernsehanlagen GmbH, Darmstadt, Germany

[22] Filed: Nov. 1, 1973

[21] Appl. No.: 411,714

[30] Foreign Application Priority Data

Nov. 10, 1972 Germany ............................ 2254941

[52] U.S. Cl. ............................ 358/31; 178/DIG. 25

[51] Int. Cl. ........................................... H04n 9/535

[58] Field of Search .............. 178/DIG. 25, DIG. 24; 358/37, 35, 80, 26, 31, 21; 328/162, 164, 163

[56] References Cited

UNITED STATES PATENTS 3,444,318 5/1969 Monteath .................... 178/DIG. 25

*Primary Examiner*—Richard Murray
*Assistant Examiner*—R. John Godfrey
*Attorney, Agent, or Firm*—Littlepage, Quaintance, Murphy & Dobyns

[57] ABSTRACT

System for comb-filtering a television signal by alternating a readily available mixed signal $2A_1 - A_0 - A_2$ by a factor $k$ which varies according to the type of color system (PAL or NTSC) being used and subtracting the mixed signal from a video signal delayed by one line $A_1$. A switching arrangement in provided for selective choice between values of $k$.

4 Claims, 7 Drawing Figures

SYSTEM FOR COMB-FILTERING TELEVISION SIGNALS

DESCRIPTION OF THE INVENTION

1. Field of Invention

The invention relates to a system for comb-filtering television signals.

2. Description of the Prior Art

In the known compatible color television systems, the color picture signal consists of a luminance signal and a chrominance signal of carrier frequency, in which systems the chrominance signal is added to the luminance signal. In order to reduce the visibility of the chrominance signal in the television picture, the NTSC color television system uses a frequency of the color carrier which amounts to an odd-numbered multiple of one half of the line frequency. In the PAL system, the coupling of the color carrier was chosen in such a way that it amounts to an odd-numbered multiple of one quarter of the line frequency.

Comb filters are now employed in the television art preferably for separating the mutually crossed spectral lines of luminance and chrominance signals. Also for improving picture quality, filters with comb-shaped frequency curves are used in the television art, for example, for filtering out cross noise from the luminance signal, or luminance components in color signals, in order to eliminate cross color.

The cost of such comb filters is mainly determined by their expensive delay devices. The present invention discloses a system for comb-filtering television signals, wherein signal components which are present in the area of the chrominance spectral lines either according to the NTSC or the PAL method, are selectively filtered out from the luminance signal by simple means. Such a selective switch is desired, for example, in horizontal aperture correction systems for color standard converting devices, so as to suppress the interfering components, depending on the direction of the standard conversion (PAL to NTSC or NTSC to PAL).

SUMMARY OF THE INVENTION

This problem is solved, according to the invention, by adding a television signal mixture $-k(2A_1-A_0-A_2)$ from three time-consecutive lines ($A_2$, $A_1$, and $A_0$) of an input television signal to a television signal $A_1$ that is delayed by the duration of one line. In this process, the television signal $A_0$ is not delayed, while the signal $A_1$ is delayed by the duration of one line and the signal $A_2$ is delayed by the duration of two lines. The damping coefficient $k$ is set as $k=\frac{1}{2}$ in color television systems with quarter-line offset, and as $k=\frac{1}{4}$ for half-line offset.

As advantageous development of the system of the invention is characterized in that the added television signal mixture $-k(2A_1-A_0-A_2)$ constitutes the correcting signal of a known vertical aperture corrector.

This device makes the delay devices of the known comb filter arrangements superfluous because now the correcting signal produced by the vertical aperture corrector is used in a two-fold way. Usually such vertical aperture correctors are installed in television sets, so that the television signal $A_1$ delayed by the duration of one line as well as the television signal mixture $+k(2A_1-A_0-A_2)$ are known, for example from FIGS. 1,3, and 4 of German Offenlegungsschrift No. 1,462,775, and of corresponding U.S. Pat. No. 3,444,318.

The system of the invention offers the further advantage that by simply shifting the amplitude of the added television signal mixture, a comb-filtered television signal is obtained which is selectively combed out, either at the half-line offset distance according to the NTSC method or at the quarter-line offset distance according to the PAL method.

BRIEF DESCRIPTION OF THE DRAWINGS

The invention will now be explained in greater detail with the aid of the embodiment illustrated in the figures.

DESCRIPTION OF THE PREFERRED EMBODIMENT

Figure 1A:
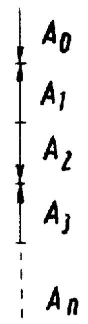
FIGS. 1*a*, 1*b*, and 1*c* illustrate vector diagrams for explaining the invention in the half-line offset operation.
Figure 1B:
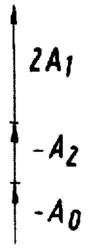
Figure 1C:
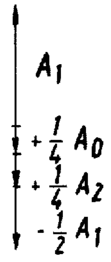

The system of the invention utilized the fact that in the half-time offset (NTSC), the phase of the color component jumps from line to line by 180° (FIG. 1*a*). The color component in the correcting signal $+2A_1-A_0-A_2$ of a vertical aperture corrector is accordingly in a vectorial position according to FIG. 1*b*. When now, according to the invention, the correcting signal is deducted, as in FIG. 1*b*, from a television signal $A_1$ that is delayed by the duration of one line, the vector diagram of FIG. 1*c* is produced when the correcting signal is attenuated by $k=\frac{1}{4}$. The chrominance component is extinguished.

Figure 2A:
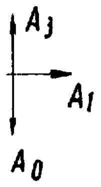
FIGS. 2*a*, 2*b*, and 2*c* illustrate vector diagrams for explaining the invention in the quarter-line offset operation.
Figure 2B:
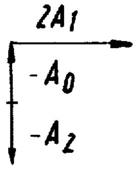
Figure 2C:
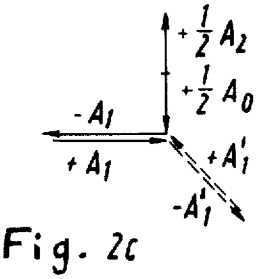

Unlike the half-line offset, the phase of the color component jumps by 180° with the quarter-line (PAL) only after each two line periods (FIG. 2*a*). FIG. 2*b* shows the vector diagram of the color component in the correcting signal $+2A_1-A_0-A_2$. In this illustration, $A_0$ and $A_2$ extinguish each other, so that only $2A_1$ is left. A deduction of this remaining television signal $2A_1$ with the coefficient $k=\frac{1}{2}$ from a television signal $A_1$ effects a complete extinction of the color component (FIG. 2*c*). From the vectors shown in dash lines, it can be seen that even different PAL switching phases do not disturb and are in each case correctly extinguished.

Figure 3:
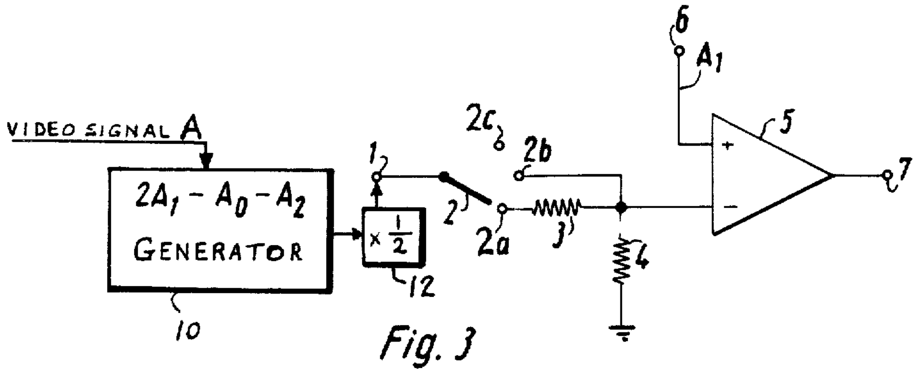
FIG. 3 is a schematic circuit diagram of a device, including the switching device, for carrying out various offset operation.

In the circuit of FIG. 3, the correcting signal $+\frac{1}{2}(2A_1-A_0-A_2)$ of a vertical aperture corrector is fed, by way of a terminal 1, to the contact blade of a step switch 2. This step switch has three contact positions. In the first (shown) contact position 2*a* of step switch 2, the correcting signal passes, in the case of the half-line offset, by way of a voltage divider consisting of resistors 3 and 4, to the inverting input of a differential-amplifier 5. In the second contact position 2*b*, the correcting signal is fed, at the quarter-line offset, directly to the inverting input of a differential-amplifier 5. When step switch 2 is in the third contact position 2*c* the inverting input of differential-amplifier 5 remains open. The non-inverting input of differential-amplifier 5 is connected to terminal 6 to which the television signal $A_1$, which is delayed by the duration of one line, is connected. At the output of differential-amplifier 5 at a terminal 7, the comb-filtered television signal can be collected.

The circuit operated as follows:

When a luminance signal is required in which interferring signals located in the area of chrominance spectral lines according to the NTSC method are to be comb-filtered out, step switch 2 is switched to the first contact position 2*a*. The amplitude of the correcting signal from a generator 10 fed by way of terminal 1, has previously been adjusted by means of an attenuating circuit 12 in such a manner that the attenuation coefficient signal $k$ equals ½. Generator 10 may be a vertical aperature corrector of the type illustrated in U.S. Pat. No. 3,444,318, wherein the correcting signal may be derived from the output of element 17. The amplitude of the correcting signal $k(2A_1 - A_0 - A_2)$ at terminal 1 becomes therefore $\frac{1}{2}(2A_1 - A_0 - A_2)$. The amplitude of this correcting signal, attenuated by one half by means of resistors 3 and 4, is fed to the inverting input of differential-amplifier 5. In the circuit position now seen, there is therefore a tv mixture at the inverting input of sum-and-difference amplifier 5 of the amplitude $\frac{1}{4}(2A_1 - A_0 - A_2)$ which is subtracted from television signal $A_1$ fed by way of terminal 6. At terminal 7, there appears the difference signal $A_1 - \frac{1}{4}(2A_1 - A_0 - A_2) = A_1 - \frac{1}{2}A_1 + \frac{1}{4}A_0 + \frac{1}{4}A_2 = \frac{1}{4}A_0 + \frac{1}{2}A_1 + \frac{1}{4}A_2$.

This difference signal $\frac{1}{4}A_0 + \frac{1}{2}A_1 + \frac{1}{4}A_2$ corresponds to the signal mixture of the comb-filtered television signal, wherein signals in the area of the chrominance spectral lines which are crossed with the luminance spectral lines according to the half-line offset were filtered out.

when in the second contact position 2*b* of step switch 2, the television signal mixture of the amplitude $\frac{1}{2}(2A_1 - A_0 - A_2)$ existing at terminal 1 is applied directly to the inverting input of differential-amplifier 5, a difference signal $A_1 - \frac{1}{2}(2A_1 - A_0 - A_2) = \frac{1}{2}A_0 + \frac{1}{2}A_2$ is produced. This difference signal $\frac{1}{2}A_0 + \frac{1}{2}A_2$ corresponds to the signal mixture of the comb-filtered television signal wherein signals in the area of the chrominance spectral lines, which are crossed with the luminance signal according to the quarter-line offset, were filtered out.

When the step switch is in the third contact position 2*c*, only the television signal $A_1$, delayed by the duration of one line, appears at the output of differential-amplifier 5 with terminal 7.

The system of the invention is not restricted only to circuit arrangement with a differential-amplifier. Analogously, the added television signal mixture $\frac{1}{2}(2A_1 - A_0 - A_2)$ can also be added to signal $A_1$ in the form of the vertical aperture correcting signal in other subtr^ction devices.

When a television signal is required which needs to be comb-filtered for a specific offset operation only, the step switch may be omitted and the inverting input of differential-amplifier 5 can be controlled directly with the television mixture.

I claim:

1. System for comb-filtering tv signals, comprising:
   A. means for generating a television signal mixture $k(2A_1 - A_0 - A_2)$, wherein $A_2$, $A_1$, and $A_0$ represent three time-sequential lines of an input television signal,
   B. means for subtracting the signal mixture from a television signal $A_1$ which is the input television signal delayed by the duration of one line, wherein the television signal $A_0$ is not delayed, the television $A_1$ is delayed by the duration of one line, and the television signal $A_2$ is delayed by the duration of two lines, and
   C. means for switchng the attenuation $k$ between $k = \frac{1}{2}$ for color television systems with a quarter-line offset and $k = \frac{1}{4}$ for systems with a half-line offset.
2. A system according to claim 1, wherein the generating means for mixture $k(2A_1 - A_0 - A_2)$ comprises a vertical aperture corrector.
3. A system according to claim 1, wherein the subtracting means comprises a differential-amplifier with an inverting and a non-inverting input and an output, to which amplifier the television signal $A_1$, delayed by the duration of one line is fed to one input, and the television signal mixture $k(2A_1 - A_0 - A_2)$ is fed to the other input, and in which a comb-filtered television signal can be collected at the output.
4. A method for comb-filtering a video signal A, where $A_0$ is the undelayed video signal, $A_1$ is the video signal delayed by the time duration of one line, and $A_2$ is the video signal delayed by the time duration of two lines, comprising the steps of
   A. combining signals $A_0$, $A_1$, and $A_2$ to form a signal $2A_1 - A_0 - A_2$,
   B. attenuating the signal $2A_1 - A_0 - A_2$ by an attenuation factor to obtain a signal $k(2A_1, -A_0 - A_2)$, and
   C. subtracting the signal $k(2A_1 - A_0 - A_2)$ from the signal A, to derive a signal $A_1 - k(2A_1 - A_0 - A_2)$, which is a comb-filtered signal.

* * * * *